United States Patent [19]
Chahabadi et al.

[11] Patent Number: 5,606,619
[45] Date of Patent: Feb. 25, 1997

[54] CIRCUIT ARRANGEMENT FOR DERIVING A SIGNAL INDICATING NOISE IN A RECEIVED STEREO MULTIPLEX SIGNAL

[75] Inventors: Djahanyar Chahabadi; Matthias Herrmann; Lothar Vogt, all of Hildesheim; Juergen Kaesser, Diekholzen, all of Germany

[73] Assignee: Blaupunkt-Werke GmbH, Hildesheim, Germany

[21] Appl. No.: 343,416

[22] PCT Filed: Mar. 22, 1994

[86] PCT No.: PCT/DE94/00322

§ 371 Date: Feb. 13, 1995

§ 102(e) Date: Feb. 13, 1995

[87] PCT Pub. No.: WO94/22230

PCT Pub. Date: Sep. 29, 1994

[30] Foreign Application Priority Data

Mar. 24, 1993 [DE] Germany .......................... 43 09 518.6

[51] Int. Cl.$^6$ ........................................................ H04H 5/00
[52] U.S. Cl. ............................. 381/13; 381/94; 455/306
[58] Field of Search ............................. 381/98, 103, 106, 381/7, 13, 94; 455/303, 304, 306, 222, 223; 331/20, 25

[56] References Cited

U.S. PATENT DOCUMENTS 5,226,088  7/1993  Winterer ........................ 381/13
5,418,859  5/1995  Cho .............................. 381/98

OTHER PUBLICATIONS

Reich et al., "Digital FM-Stereo Demodulation and Decoding", *Signal Processing IV: Theories and Applications*, Bd. 2, 8, Sep. 1988, Grenoble, France, pp. 490–502, XP93955.

Bakhru, "Communications Receiver Design Using Digital Processing", *Digital Signal Processing*, Bd. 2, Nr. 1, Jan. 1992, Orlando, Florida, U.S., pp. 2–13, XP387796.

*Primary Examiner*—Curtis Kuntz
*Assistant Examiner*—Minsun Oh
*Attorney, Agent, or Firm*—Kenyon & Kenyon

[57] ABSTRACT

A circuit arrangement for deriving the signal indicating noise in a received stereo multiplex signal, wherein the stereo multiplex signal is present as a digital signal with a first sampling rate that is substantially higher than twice the upper limit of the useful frequency range of the stereo multiplex signal, and the received stereo multiplex signal is passed through a low-pass filter. The low-pass filtered signal and the received stereo multiplex signal are subjected to decimation to a second sampling rate, which is higher than twice the upper limit of the useful frequency range of the stereo multiplex signal. The two stereo multiplex signals with the second sampling rate are subtracted from one another.

14 Claims, 2 Drawing Sheets

CIRCUIT ARRANGEMENT FOR DERIVING A SIGNAL INDICATING NOISE IN A RECEIVED STEREO MULTIPLEX SIGNAL

FIELD OF THE INVENTION

The invention relates a circuit arrangement for deriving a signal indicating noise in a received stereo multiplex signal, wherein the stereo multiplex signal is present as a digital signal with a first sampling rate, which is substantially higher than twice the upper limit of the useful frequency range of the stereo multiplex signal.

BACKGROUND INFORMATION

Spectral components above the useful frequency range of a stereo multiplex signal signify noise in the reception of the stereo multiplex signal, which, without further measures, are noticeable as audible noise in the reproduced audio signals. Thus, for example, the ignition spark of an internal combustion engine transmits short high-frequency pulses within a broad frequency range, which results in the aforementioned spectral components in the stereo multiplex signal. Therefore circuit arrangements are known, especially for car radios, which influence the audio signals in a suitable manner depending on the appearance of such spectral components, for example, by sustaining for a short period an amplitude that was present prior to the appearance of the noise.

The object of the present invention is to provide a circuit arrangement, which advantageously obtains those spectral components of the multiplex signal which indicate noise (interference), the requirements of digital signal processing having to be taken into account, in particular—for example a lowest possible requirement for computing power.

SUMMARY OF THE INVENTION

This objective is solved according to the invention in that the received stereo multiplex signal is directed through a low-pass filter, the low-pass-filtered and the received stereo multiplex signal are each subjected to a decimation to a second sampling rate, which is more than twice the upper limit of the useful frequency range of the stereo multiplex signal, and both stereo multiplex signals with the second sampling rate are subtracted from one another.

The circuit arrangement of the present invention has the advantage that the signal indicating noise basically corresponds to the above-described spectral components, but takes up a lower frequency range. Thus, on the one hand, further processing at a lower sampling rate is possible. On the other hand, this signal can be further processed depending on the requirements of the connected circuits, since it contains the basic characteristics of the aforementioned spectral components. Thus, for example, a signal derived with the circuit arrangement of the present invention can control a circuit for temporary storage of the multiplex signal amplitude in order to suppress noise caused by ignition sparks. A signal derived with the circuit arrangement of the present invention can also be used, after suitable further processing via filters and, as the case may be, combination with other signals, for masking the audio signals and for stereo-mono switching.

One improvement of the circuit arrangement of the present invention consists of the low-pass filter having a gradually decreasing frequency response within the useful frequency range. Such a filter is relatively inexpensive and not subject to high quality requirements.

In this improvement of the present invention it is, however, preferably provided that the low-pass filtered stereo multiplex signal passes through a filter at the second sampling rate in order to compensate for the decreasing frequency response of the low-pass filter. Thus, a straight-line frequency response in the useful frequency range is possible in spite of the use of a relatively simple filter.

The circuit arrangement of the present invention is also suited for decimation of the sampling rate of the stereo multiplex signal in the useful frequency range, so that in a further improvement of the present invention, it is provided that the output signal of the filter can be further supplied to a stereo decoder for compensation via a noise suppression circuit.

The circuit arrangement of the present invention can, however, also be configured so that the low-pass filter has constant frequency response over a significant portion of the useful frequency range. In this case, no compensation filter is required after decimation, even for strict requirements.

An advantageous embodiment of the present invention consists of the first sampling rate being equal to 456 kHz and the second sampling rate to 228 kHz.

DETAILED DESCRIPTION OF THE INVENTION

Figure 1:
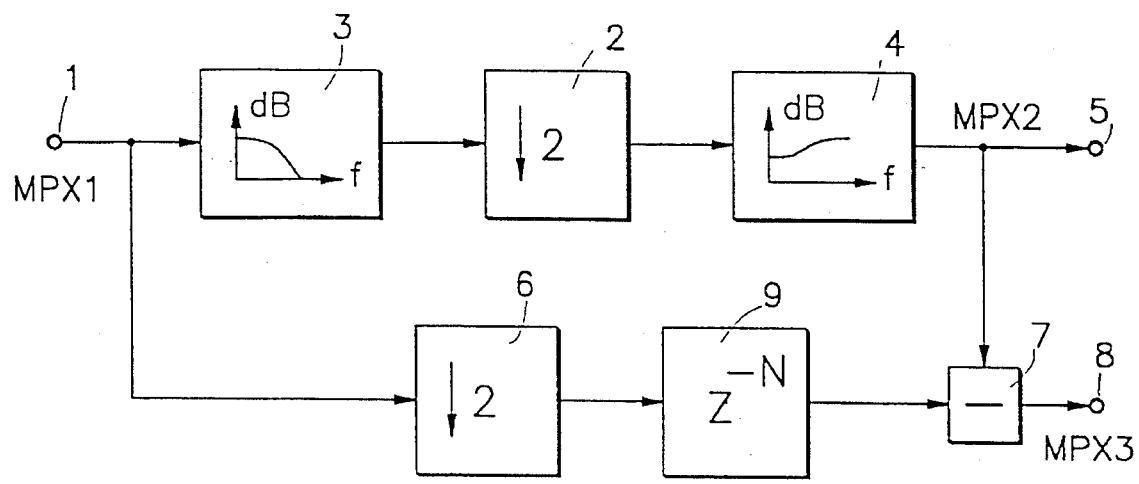
FIG. 1 shows a first embodiment of a circuit arrangement according to the present invention.

The same parts have been given the same reference numerals in the figures. Examples of embodiment and their parts are shown as block diagrams. This, however, does not mean that the circuit arrangement according to the present invention is limited to an implementation with the help of individual circuits corresponding to the blocks. The circuit arrangement of the present invention can be implemented in an especially advantageous manner using highly integrated circuits. Thus, for example, a digital signal processor, which, when suitably programmed, performs the processing steps shown in the block diagram, can be used. The circuit arrangement of the present invention, together with other circuit arrangements within an integrated circuit, can constitute important parts of a radio receiver.

A digital stereo multiplex signal MPX1, with a sampling rate of 456 kHz, which is an integer multiple of the radio data signal carrier frequency (57 kHz), is supplied to an input 1 of the embodiment of the present invention FIG. 1. This high sampling rate, however, requires a large number of computing operations per second. In a digital radio receiver, it is therefore advantageous to operate with the lowest possible sampling rates, matched to the band width of the respective signal. Therefore signal MPX1 is subjected to sampling rate halving at decimation circuit 2, for which an upstream low-pass 3 is required. Since, however, the required low-pass filter with a straight-line frequency response over the major part of the passband and with a steep drop in the range of the upper limit frequency is very expensive, a low-pass filter 3 having a gradual drop is used. A compensation filter 4 with an opposite frequency response eliminates the errors thus produced. Then a signal MPX2 is available at output 5 of the compensation filter 4, which can be further processed for obtaining the audio signals to be forwarded, as is explained later on using the example of FIG. 5.

In order to obtain a signal indicating spectral components above the useful frequency range, at subtraction circuit 7 multiplex signal MPX2 is subtracted from multiplex signal MPX1, which was subjected to sampling rate halving at decimation circuit 6 and thus has a sampling rate of 228 kHz. Then the desired signal indicating noise, which has the spectral components of the upper frequency range, while being in a lower frequency range, is available at output 8 of the subtractor. This signal is designated MPX3 in conjunction with the further explanation of the embodiment examples. To compensate for the propagation delays in filters 3 and 4, a delay circuit 9 by N sampling periods is provided. In an actual implementation of the circuit arrangement of the invention, filter 3 has the following form:

$$B(z)=0.159(1+z^{-1})^6 \circ (1+1.41z^{-1}+z^{-2}),$$

while compensation filter 4 has the following form:

$$C(z)=c_1z^{-1}+c_2z^{-3}+c_3z^{-3}+c_4z^{-4}+c_5z^{-5}+c_6z^{-6}+c_7.$$

The obviously more complex calculations of compensation filter 4 are, however, required at a lower frequency level, so that they affect the overall complexity to a lower degree.

Figure 2:
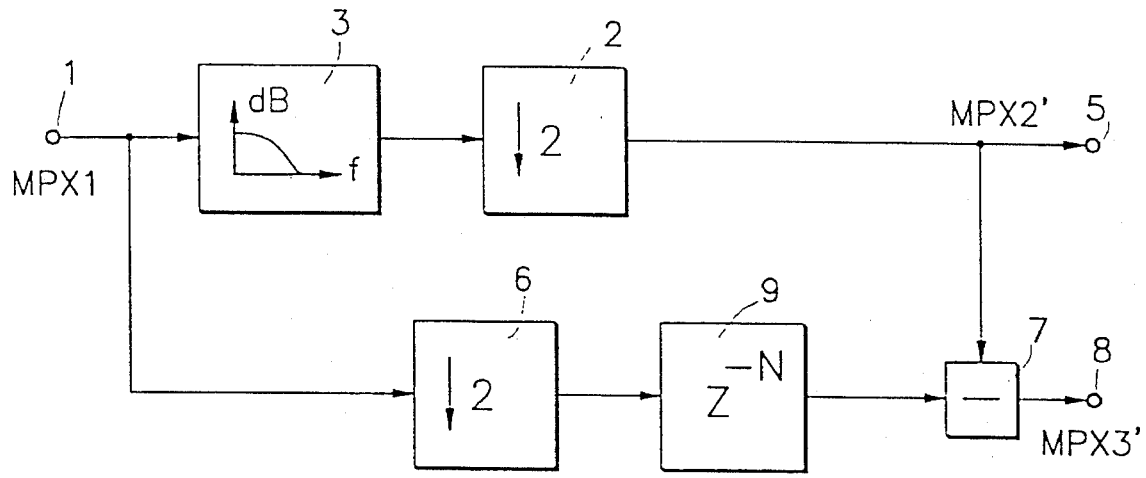
FIG. 2 shows a second embodiment of a circuit arrangement according to the present invention.

The embodiment according to the present invention shown in FIG. 2 is basically similar to that of FIG. 1, but no compensation filter 4 is provided, so that multiplex signal MPX2' has a drop toward the higher frequencies also in the useful frequency range. In addition, signal MPX3' contains useful signal components, since the useful signal is not fully subtracted from the useful signal component of signal MPX1 at subtractor circuit 7. If this can be tolerated in an individual case, the embodiment FIG. 2 has the advantage that the complexity of calculations is kept low, like in the embodiment FIG. 1, specifically by providing a simpler filter with fewer computing operations at the higher frequency level.

Figure 3:
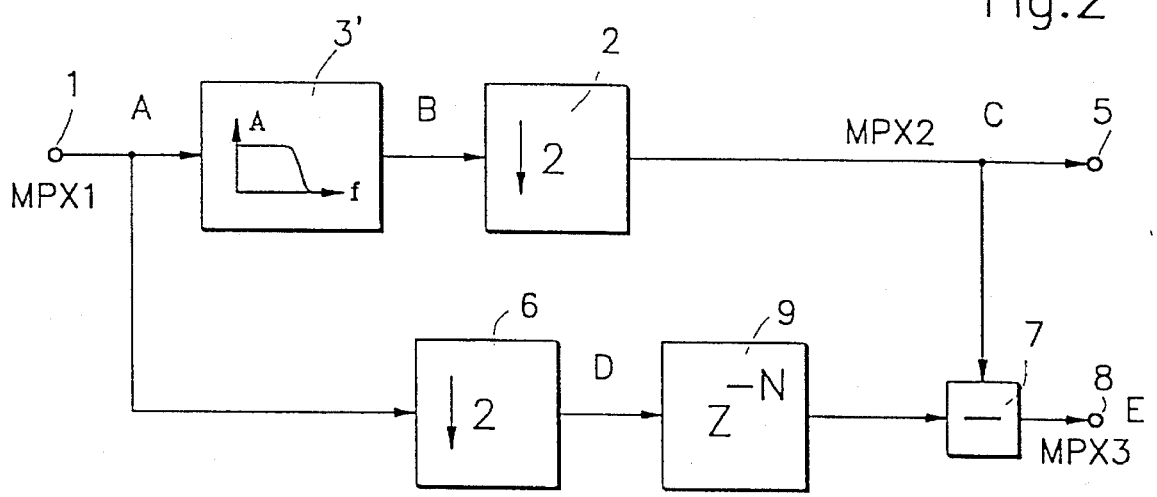
FIG. 3 shows a third embodiment of a circuit arrangement according to the present invention.
Figure 4:
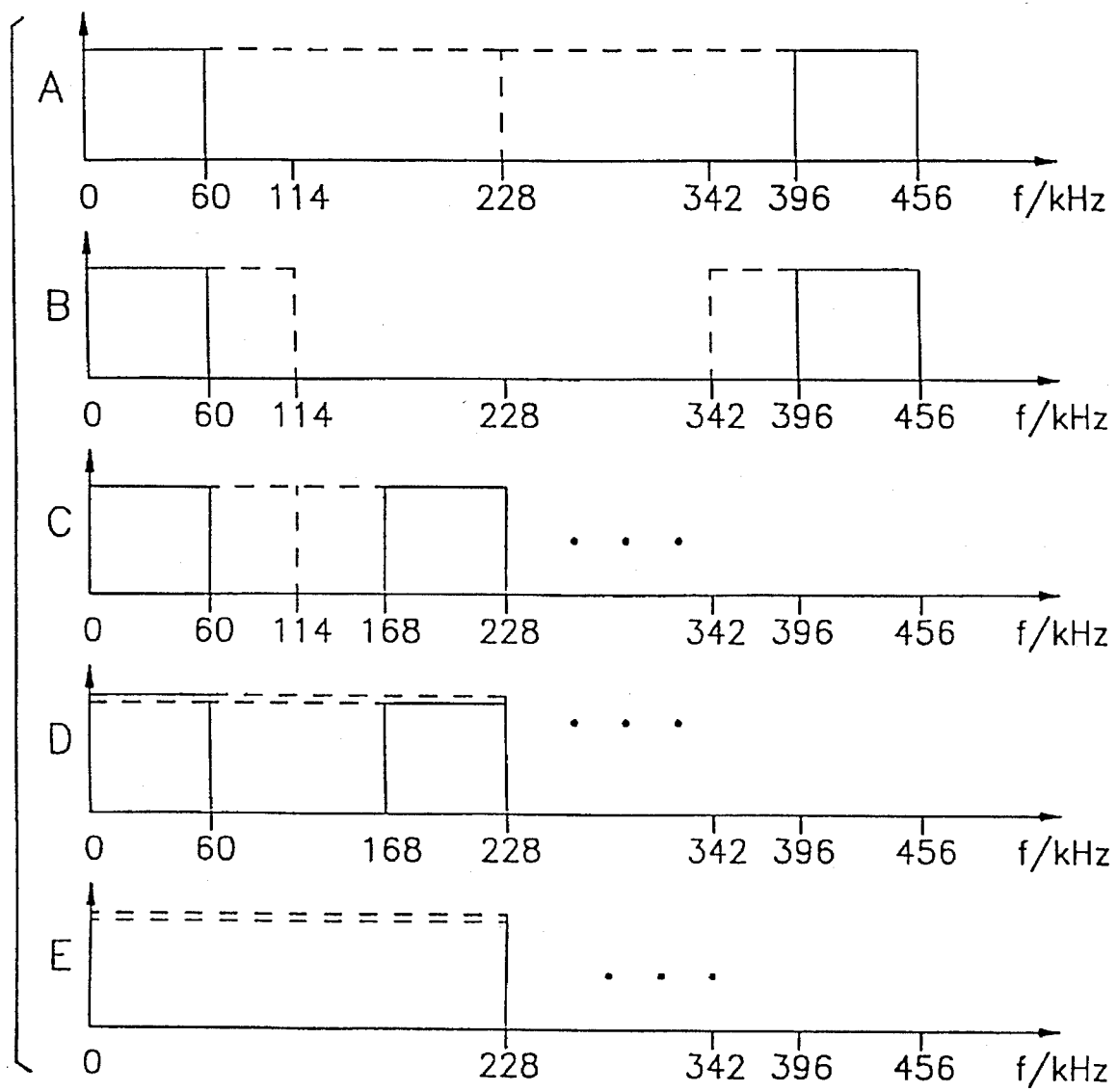
FIG. 4 is a schematic representation of the spectra of the signals obtained in the embodiments shown in FIGS. 1–3 according to the present invention.

In the embodiment FIG. 3, a filter 3', with a flat frequency response in the useful frequency range, is provided prior to decimation 2. Therefore, a compensation filter is no longer needed. However, more complex calculations are needed for filter 3' at the higher frequency level. Points of the circuit arrangement of FIG. 3 are designated as the corresponding lines of FIG. 4, representing the spectra of the signals present at these points.

Line A represents the spectrum of signal MPX1; the useful spectrum of the stereo multiplex signal is in the frequency range of 0 kHz to 60 kHz and a noise spectrum —designated with a dashed line—between 60 kHz and 228 kHz. The representation is highly schematic in that the amplitudes are assumed to be constant regardless of the actual presence of individual spectral components. The corresponding reflected signal components are between 228 kHz and the sampling frequency of 456 kHz. The spectrum shown in line B is obtained through filtering at 3' (FIG. 3). The range between 342 kHz and 456 kHz (line C) is then shifted into the range between 114 kHz and 228 kHz via decimation at decimation circuit 2.

The signal shown in line D, in which a useful spectrum between 0 kHz and 60 kHz with a noise spectrum of 60 kHz to 228 kHz and a useful spectrum between 168 kHz and 228 kHz with a noise spectrum of 0 kHz to 168 kHz are superimposed, is obtained through decimation of signal MPX1 at decimation circuit 6. Through subtraction at subtractor circuit 7 the signal shown in line E is obtained without the useful spectra. This signal can be further analyzed in a suitable manner, for example, via numerical analysis, integration and/or further decimation.

Figure 5:
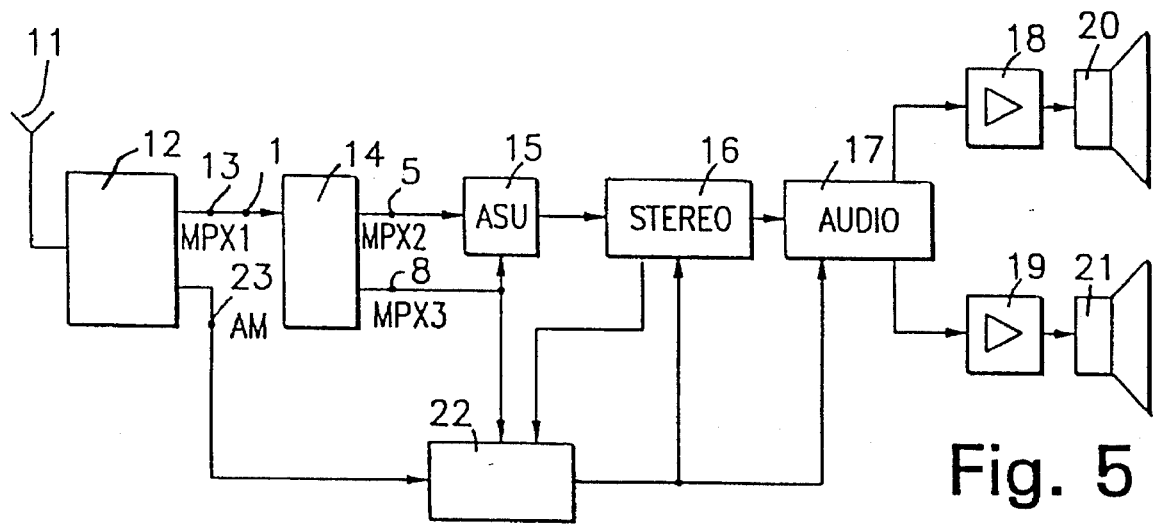
FIG. 5 shows a block diagram of a radio receiver with a circuit arrangement according to the present invention.

FIG. 5 shows essential components of a radio receiver, specifically the components that are necessary for explaining the use of the circuit arrangement according to the invention within a radio receiver. The signal received via an antenna 11 is amplified, selected and demodulated in a tuner 12 in a well-known manner. The stereo multiplex signal MPX1 is supplied from an output 13 of tuner X2 to input 1 of a circuit arrangement according to the invention 14. The stereo multiplex signal is extracted from output 5 of the circuit arrangement according to the invention 14 and supplied, via an automatic noise suppression circuit 15, to a stereo decoder 16, followed by an audio processor 17. The audio processor outputs are then connected to LF amplifiers 18 and 19, which control speakers 20 and 21.

Signal MPX3 indicating noise, derived from circuit arrangement 14 of the invention, is supplied to a control input of the noise suppression circuit 15 via output 8. There, if noise is present, sampling values containing noise are replaced with the previously received correct sampling values within the stereo multiplex signal as described previously. Such a circuit is described for example in German Patent Application No. P 43 30 892.9 of the Applicant.

Signal MPX3 then goes to a circuit 22 for derivation of signals reflecting the reception quality. An AM signal, obtained by amplitude modulation of the FM intermediate frequency signal, is also supplied to this circuit from an output 23 of tuner 12. Furthermore, circuit 22 receives from stereo decoder 16 signals designating the symmetry of the sidebands of the modulated auxiliary carrier. From these signals, circuit 22 forms a signal characterizing the reception quality, which, in the radio receiver illustrated in FIG. 5, is supplied to stereo decoder 16 for controlling stereo-mono switching and to audio processor 17 for temporary volume reduction. Details of a circuit 22 are described for example in German Patent Application No. P 43 09 518.6 of the Applicant.

What is claimed is:

1. A circuit arrangement for deriving a noise signal indicating noise in a digital stereo multiplex signal, comprising:

a first circuit for receiving the digital stereo multiplex signal at a first sampling rate, the first sampling rate being at least as great as a first predetermined rate, the first circuit including a low pass filter coupled to a first decimation circuit for generating a first output signal at a second sampling rate, the second sampling rate being lower than the first sampling rate and at least as great as a second predetermined rate;

a second circuit for receiving the stereo multiplex signal at the first sampling rate, the second circuit including a second decimation circuit for generating a second output signal at the second sampling rate; and a subtractor circuit coupled to the first circuit and the second circuit for generating the noise signal as a function of the first output signal and the second output signal.

2. The circuit arrangement according to claim 1, wherein the first predetermined rate is substantially greater than two times an upper limit of a useful frequency range of the digital stereo multiplex signal, and wherein the second predetermined rate is greater than two times the upper limit of the useful frequency range of the digital stereo multiplex signal.

3. The circuit arrangement according to claim 2, wherein the low pass filter has a gradually decreasing frequency response within the useful frequency range of the digital stereo multiplex signal.

4. The circuit arrangement according to claim 2, wherein the low pass filler has a constant frequency response over a portion of the useful frequency range.

5. The circuit arrangement according to claim 2, wherein the first predetermined rate is 456 kHz and the second predetermined rate is 228 kHz.

6. The circuit arrangement according to claim 3, wherein the first circuit further includes a compensation filter for compensating a decreasing frequency response of the low pass filter at the second sampling rate.

7. A circuit arrangement for deriving a noise signal indicating noise in a stereo multiplex signal, comprising:

a first circuit for receiving the stereo multiplex signal at a first sampling rate, for low-pass filtering the stereo multiplex signal, and for outputting a first output signal at a second sampling rate that is lower than the first sampling rate, the first circuit including a first decimination cirucit;

a second circuit for receiving the stereo multiplex signal at the first sampling rate and outputting a second output signal at the second sampling rate, the second circuit including a second decimation circuit; and a subtractor circuit coupled to the first circuit and the second circuit for generating the noise signal as a function of the first output signal and the second output signal.

8. A method for deriving a noise signal indicating noise in a digital stereo multiplex signal, comprising the steps of:

receiving the digital stereo multiplex signal in a first circuit at a first sampling rate, the first sampling rate being at least as great as a first predetermined rate, the first circuit including a low pass filter coupled to a first decimation circuit for generating a first output signal at a second sampling rate, the second sampling rate being lower than the first sampling rate and at least as great as a second predetermined rate;

receiving the digital stereo multiplex signal in a second circuit at the first sampling rate, the second circuit including a second decimation circuit for generating a second output signal at the second sampling rate; and coupling a subtractor circuit to the first circuit and the second circuit for generating the noise signal as a function of the first output signal and the second output signal.

9. The method according to claim 8, wherein the first predetermined rate is substantially greater than two times an upper limit of a useful frequency range of the digital stereo multiplex signal, and wherein the second predetermined rate is greater than two times the upper limit of the useful frequency range of the digital stereo multiplex signal.

10. The method according to claim 9, wherein the low pass filter has a gradually decreasing frequency response within the useful frequency range of the stereo multiplex signal.

11. The method according to claim 10, wherein the first circuit further includes a compensation filter for compensating a decreasing frequency response of the low pass filter at the second sampling rate.

12. The method according to claim 11, further comprising the step of coupling the first output signal to a stereo decoder for compensation via a noise suppression circuit.

13. The method according to claim 8, wherein the low pass filter has a gradually decreasing frequency response within the useful frequency range of the stereo multiplex signal.

14. The method according to claim 8, wherein the first predetermined rate is 456 kHz and the second predetermined rate is 228 kHz.

* * * * *